United States Patent Office 3,634,469
Patented Jan. 11, 1972

3,634,469
METHYLENATED STEROIDS AND PROCESS
Leonard N. Nysted, Highland Park, Ill., assignor to
G. D. Searle & Co., Chicago, Ill.
No Drawing. Continuation-in-part of abandoned application Ser. No. 675,788, Oct. 17, 1967. This application Oct. 13, 1969, Ser. No. 865,965
Claims priority, application Great Britain, Oct. 16, 1968, 49,081/68
Int. Cl. C07c *169/20*
U.S. Cl. 260—397.5                12 Claims

ABSTRACT OF THE DISCLOSURE

Methylenated steroids are manufactured by reaction of the corresponding keto-steroids with a methylenating agent prepared by the reaction of zinc with a methylene halide in a solvent such as tetrahydrofuran or an alkylene glycol ether or dialkoxyalkyl ether and are useful as intermediates in the manufacture of the corresponding methyl derivatives.

---

This application is a continuation-in-part of my co-pending application Ser. No. 675,788, filed Oct. 17, 1967, now abandoned.

The present invention is concerned with a novel process for introducing a methylene group into the steroid molecule and with the novel methylenated derivatives produced thereby. That process involves the reaction of a keto-steroid with the novel reagent prepared by reaction of activated zinc with a methylene halide in a solvent capable of complexing with the halozincmethylene compound produced. Particularly preferred methylene halides are methylene bromide and methylene iodide. Suitable solvents are tetrahydrofuran, dioxane, alkylene glycol ethers such as ethylene glycol dimethyl ether and dialkoxy alkyl ethers such as diethylene glycol dimethyl ether. Tetrahydrofuran and ethylene glycol dimethyl ether are especially preferred. Simple open-chain alkyl ethers such as diethyl ether are less desirable.

The present process is advantageous over previously known methods for converting ketones to the corresponding methylene compounds. The Wittig reaction described in Advanced Organic Chemistry, Fieser and Fieser, pages 482–6, Reinhold Publishing Corp., New York (1961) thus suffers from a number of disadvantages. As pointed out in that textbook, the triphenylphosphinemethylene reagent is unstable to air, therefore must be prepared in situ. Preparation of the reagent is, furthermore, time consuming in view of the fact that several days are required for preparation of the necessary precursor, i.e. methyl triphenylphosphonium bromide, from triphenylphosphine and methyl bromide. In addition, the Wittig reagent requires more costly raw materials for its preparation. It is noted also that the Wittig reaction is conducted in the presence of a base, usually phenyl lithium. Such conditions are obviously unsuitable for application to steroids with base-sensitive side-chains, e.g. the corticoid side-chain.

The use of an iodomethyl zinc iodide reagent to convert olefins to the corresponding cyclopropane is described by Simmons and Smith, J. Am. Chem. Soc., 81, 4256 (1959). That reagent is obtained by the reaction of a zinc-copper couple with methylene iodide and is prepared in situ in the reaction mixture containing the olefin.

It has been determined that the present reagent is selective in its action, depending upon the nature of the keto-steroid starting material. 11- and 17-keto steroids, wherein there is not present an adjacent activating group, are completely unreactive. Unactivated 20-keto groups react very slowly. Similarly, starting materials containing an α,β-unsaturated keto group and lacking an adjacent activating group are inert. An isolated 3-keto group is, however, quite reactive. The insertion of an activating group adjacent to an otherwise unreactive keto group results in highly reactive starting materials. Especially effective activating groups are those containing an oxygen or nitrogen function. Specific examples are the hydroxy and oximino moieties. Starting materials possessing the ketol

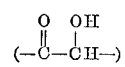

structure are thus especially suitable for conversion by the instant process. The steroidal ketols represented by the following partial structural formulas

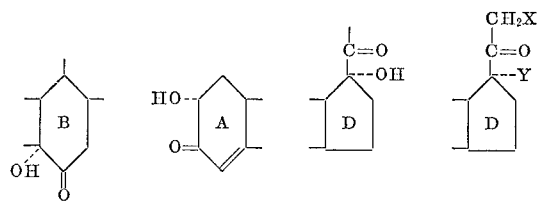

wherein X is a hydroxy or acetoxy group and Y is hydrogen or a hydroxy or acetoxy group are thus specific examples of preferred starting mterials. Particular species within the scope of those formulas are 17α-hydroxypregn-4-ene-3,20-dione,
17β-acetoxy-2α-hydroxyester-4-en-3-one,
3β,21-dihydroxypregn-5-en-20-one,
21-hydroxypregn-4-ene-3,20-dione,
21-acetoxy-17α-hydroxypregn-4-ene-3,11,20-trione,
17β-acetoxy-2α-hydroxyandrost-4-en-3-one,
3β-benzyloxy-5α-hydroxypregnane-6,20-dione 20-ethylene ketal,
3β,17β-diacetoxy-5α-hydroxyandrostan-6-one and 3β,17α-diacetoxy-5α-hydroxypregnane-6,20-dione.

The instant novel reagent is prepared by heating activated zinc with the appropriate methylene halide in one of the aforementioned complexing solvents. Activation of the zinc can be effected, alternatively, by formation of a zinc-lead couple or by heating with a hydrogen halide. A specific example is the reaction of zinc, activated by heating in methanol with hydrogen chloride, with methylene bromine in tetrahydrofuran to afford the bromozincmethylene tetrahydrofuran reagent, wherein the respective groups are present in the ratio of two bromine atoms to three zinc atoms to two methylene groups to one tetrahydrofuran molecule. The likely structure is shown below:

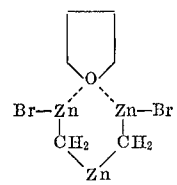

The novel process of the present invention is conveniently conducted at room temperature in a suitable organic solvent such as tetrahydrofuran. A particular application of that process is the reaction of 3β,17α-diacetoxy - 5α - hydroxypregnane - 6,20 - dione with the aforementioned triszincbismethylene dibromide tetrahydrofuran reagent in tetrahydrofuran to afford 3β,17α-diacetoxy - 5α - hydroxy - 6 - methylenepregnan - 20 - one.

The novel methylene steroids of the present invention are particularly useful as intermediates in the manufacture of the known and useful corresponding methyl compounds. The instant 6-methyleneandrostane-3β,5α,17β-triol, for example, is oxidized with chromium trioxide to afford 5α - hydroxy - 6-methyleneandrostane-3,17-dione, which is catalytically hydrogenated in the presence of a palladium catalyst to yield 5α-hydroxy-6α-methylandrostane-3,17-dione. Dehydration of the latter substance by reaction with thionyl chloride in pyridine affords 6α-methylandrost-4-ene-3,17-dione, which is reduced with sodium borohydride to afford 17β-hydroxy-6α-methylandrost-4-en-3-one. The latter substance, which is described by Ringold et al., J. Org. Chem., 22, 99 (1959), is both an anabolic and androgenic agent.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

Method A.—To a refluxing mixture of 64 parts of lead acetate with 78.8 parts of acetic acid is added rapidly with stirring 26 parts of zinc powder in portions. At that point the heat source is removed, the stirring stopped and the acetic acid removed by suction, leaving granules of the lead-zinc couple. An additional 78.8 parts of hot acetic acid is then added; the mixture is stirred briefly and the acetic acid is removed by suction. The lead-zinc couple is washed with several portions of methylene chloride at room temperature, then is dried under a stream of nitrogen at about 125°. To the dry material is then added 90 parts of tetrahydrofuran and the temperature is lowered to approximately −15°. At that time 54 parts of methylene iodide is added with stirring and the mixture is cooled for about 10 minutes until cessation of the spontaneous reaction. Stirring is continued at room temperature for about 1 hour longer, at the end of which time the metallic residue is allowed to settle, leaving an approximately 1 M solution of the iodozincmethylene reagent.

Method B.—A mixture of 97.5 parts of zinc dust with 78.8 parts of acetic acid is stirred in a nitrogen atmosphere for about 5 minutes until a thick slurry is obtained. At that time 250 parts of water is added and the resulting mixture is stirred for several minutes. The supernatant aqueous acetic acid is decanted and an additional 250 parts of water is added. While that slurry is stirred, 37.8 parts of lead acetate trihydrate is added all at once. Stirring is continued for about 20 minutes longer, at the end of which time the aqueous supernatant is decanted. The zinc-lead couple remaining is washed with another portion of water, then several times with acetone. It is then dried in a nitrogen atmosphere at about 150°. To that couple is then added 450 parts of dry tetrahydrofuran and 135 parts of methylene iodide is added with stirring at such a rate as to maintain reflux. After the addition is complete heat is applied in order to maintain reflux for about 30 minutes. Cooling of that solution affords a tetrahydrofuran solution of the reagent possessing a concentration of approximately 0.9 M.

A portion of the latter solution is centrifuged to remove suspended lead, then is cooled to 0°. The crystalline solid is isolated by centrifugation in a nitrogen atmosphere, then is dried at room trepreature under reduced pressure. It exhibits nuclear magnetic resonance peaks at +3 cycles per second (relative to tetramethylsilane), characteristic of the methylene group, and also at −88 and −227 cycles per second, characteristic of the tetrahydrofuran present as a solvate. Elemental analysis indicates a zinc content of 15–25%, an iodine content of 50–65% and a carbon content of 13–20%.

EXAMPLE 2

To a rapidly stirred mixture of zinc with 80 parts of methanol, under nitrogen, is added 36 parts by volume of an isopropyl alcohol solution containing 9 parts of hydrogen chloride. The resulting reaction mixture is heated at the reflux temperature for about 5 minutes, at the end of which time the methanol is removed by decantation. The resulting zinc residue is dried at elevated temperature, after which time 135 parts of tetrahydrofuran and 58 parts of methylene bromide are successively added. That reaction mixture is heated at the reflux temperature for about 16 hours, then is cooled to room temperature and an additional 29 part portion of methylene bromide is added. Stirring of that reaction mixture at room temperature is continued until all of the zinc has dissolved. At that time the mixture is diluted with approximately 200 parts of methylene chloride and the resulting white solid is filtered in a nitrogen atmosphere under anhydrous conditions. The resulting solid material is washed with small portions of methylene chloride and is dried under reduced pressure at room temperature. Analysis of that reagent indicates the groups to be present in the ratio of three atoms of zinc to two atoms of bromine to two methylene groups to one molecule of tetrahydrofuran. It exhibits nuclear magnetic resonance peaks at about +68, −115 and 225 cycles per second in hexamethylphosphoramide. Its likely structure is shown below:

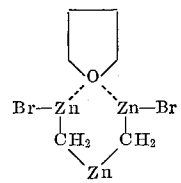

EXAMPLE 3

To a solution of 8.3 parts of 17β-acetoxy-5α-androstan-3-one in 45 parts of tetrahydrofuran is added 35 parts by volume of the approximately 1 M iodozinicmethylene reagent prepared as described in Example 1. The reaction mixture is allowed to stand at room temperature for about 72 hours, at the end of which time 50 parts by volume of 25% aqueous ammonium chloride is added cautiously, and that aqueous mixture is extracted with ether. The ether extract is washed successively with aqueous ammonium chloride and aqueous potassium bicarbonate, then is dried over anhydrous sodium sulfate. Removal of the ether by distillation in a nitrogen atmosphere affords the crude product, which is purified by recrystallization from methanol to afford 3-methylen-5α-androstan-17β-ol 17-acetate, melting at about 98–100°. Infrared absorption maxima are observed at about 3.25, 5.72, 6.05 and 7.95 microns. This compound exhibits nuclear magnetic resonance peaks at about 280 and 274 cycles per second.

EXAMPLE 4

To a solution of 22.5 parts of 17α-hydroxypregn-4-ene-3,20-dione in 22.5 parts of tetrahydrofuran is added 50 parts by volume of the approximately 1 M iodozincmethylene reagent prepared as described in Example 1, and the resulting reaction mixture is stirred in a nitrogen atmosphere at room temperature for about 15 minutes. After standing at room temperature for about 3 hours, 22.5 parts of concentrated ammonium hydroxide is added with rapid stirring. Nearly saturated aqueous ammonium chloride in the amount of 50 parts by volume is then added and the resulting precipitated solids are removed by filtration. That mixture is then extracted with ether and the ether extract is separated, then washed successively with dilute aqueous ammonium chloride and dilute aqueous potassium bicarbonate. The organic solution is dried over anhydrous sodium sulfate, then concentrated to approximately 100 parts by volume. The unreacted starting material which crystallizes at this point is removed by filtration and the filtrate is chromatographed on an alumina column. Elution of that column with benzene-ethyl acetate solutions affords pure 17α-hydroxy-20-methylenepregn-4-en-3-one, melting at about 241–243°. This compound displays an ultraviolet absorption maximum at about 242 millimicrons with a molecular extinction coefficient of about 16,400, infrared absorption peaks at about 2.87, 3.23, 5.99 and 6.20 microns and nuclear magnetic resonance maxima at about 47.5, 70, 77, 290, 293 and 345 cycles per second.

EXAMPLE 5

To a solution of 9.3 parts of 3-methoxyestra-1,3,5(10)-triene-16,17-dione 16-monoxime in 45 parts of tetrahydrofuran is added, at approximately 15° in a nitrogen atmosphere, 120 parts by volume of the approximately 1 M iodozincmethylene reagent prepared as described in Example 1, and that reaction mixture is allowed to stand at room temperature for about 24 hours. The mixture is then stirred rapidly while 25 parts by volume of nearly saturated aqueous ammonium chloride and 26 parts of acetic acid are carefully added. Dilution of that mixture with approximately 100 parts of water results in precipitation of the solid crude product which is collected by filtration, washed on the filter with water, and dried, then purified by recrystallization from chloroform-methanol to yield pure 3-methoxy-17-methylenestra-1,3,5(10)-trien-16-one 16-monoxime, melting at about 202–205°. It displays an ultraviolet absorption maximum at about 224 millimicrons with a molecular extinction coefficient of about 17,000 and also infrared absorption peaks at about 3.05, 5.80 and 6.20 microns.

EXAMPLE 6

To a solution of 17β-acetoxy-2α-hydroxyestr-4-en-3-one in 90 parts of tetrahydrofuran is added at 15° in a nitrogen atmopsere 36 parts by volume of the approximately 1 M iodozincmethylene reagent prepared as described in Example 1. When the mixture becomes homogeneous, it is allowed to stand at room temperature for about 24 hours, then is diluted with nearly saturated aqueous ammonium chloride. The organic solvent is removed by distillation under reduced pressure and the semisolid residue is recrystallized from aqueous methanol. Further purification is effected by chromatography on a silica gel column followed by elution with benzeneethyl acetate solutions. The eluted material is recrystallized from methylene chloride-hexane to afford pure 3-methylenestr-4-ene-2α,17β-diol 17-acetate, melting at about 147–149°. It displays an ultraviolet absorption maximum at about 235.5 millimicrons with a molecular extinction coefficient of 23,600 and also infrared absorption peaks at about 2.85, 5.81 and 6.10 microns.

EXAMPLE 7

To a solution of 3.3 parts of 3β,21-dihydroxy-pregn-5-en-20-one in 67.5 parts of tetrahydrofuran, in a nitrogen atmosphere, is added, at approximately 15°, 50 parts by volume of the approximately 1 M iodozinc-methylene reagent prepared as described in Example 1 and the homogeneous mixture is allowed to stand at room temperature for about 24 hours. At the end of that time nearly saturated aqueous ammonium chloride is added and the organic solvent is removed by distillation under reduced pressure. The solid which separates is collected by filtration and is purified by crystallization from methylene chloride-hexane to afford pure 20-methylene-pregn-5-ene-3β,21-diol, melting at about 186–188°. This compound exhibits infrared absorption maxima at about 3.12 and 6.12 microns.

EXAMPLE 8

To a solution of 9.9 parts of 21-hydroxypregn-4-ene-3,20-dione in 45 parts of tetrahydrofuran, in a nitrogen atmosphere, is added at approximately 15°, 200 parts by volume of an approximately 0.6 M iodozincmethylene reagent prepared as described in Example 1 and the resulting reaction mixture is stirred for about 24 hours. At the end of that time nearly saturated aqueous ammonium chloride is added carefully with rapid stirring and the organic solvent is removed by distillation under reduced pressure. The semi-solid residue is extracted into ether and the ether extract is washed successively with dilute aqueous ammonium chloride and dilute aqueous potassium bicarbonate. Drying over anhydrous sodium sulfate followed by distillation of the solvent under reduced pressure affords an oily residue which is purified by chromatography on silica gel followed by elution with benzene and benzene-ethyl acetate solutions to afford the crude product. Further purification is effected by crystallization of the eluted material from methylene chloride-hexane, thus affording pure 21-hydroxy-20-methylene-pregn-4-en-3-one, melting at about 157–158°. An ultraviolet absorption maximum is observed at about 242 millimicrons with a molecular extinction coefficient of 16,500 and infrared absorption peaks are observed at about 2.97, 3.27, 6.02 and 6.20 microns.

EXAMPLE 9

To a solution of 2.1 parts of 21-acetoxy-17α-hydroxy-pregn-4-ene-3,11,20-trione in 25 parts of tetrahydrofuran is added 50 parts by volume of an approximately 0.9 M iodozincmethylene reagent prepared as described in Example 1 and the resulting reaction mixture is stirred at room temperature for about 24 hours. At the end of that time nearly satuarted aqueous ammonium chloride is added and the organic solvent is removed by distillation under reduced pressure. The residue is chromatographed on an alumina column, then eluted with 40% ethyl acetate in benzene to yield pure 21-acetoxy-17α-hydroxy-20-methylenepregn-4-ene-3,11-dione. This compound exhibits an ultraviolet absorption maximum at about 238 millimicrons with a molecular extinction coefficient of about 17,600 and also infrared absorption peaks at about 2.88, 5.71, 5.87, 6.05 and 6.19 microns.

EXAMPLE 10

To a solution of 2 parts of 17β-acetoxy-2α-hydroxy-androst-4-en-3-one in 18 parts of tetrahydrofuran is added 30 parts by volume of approximately 0.9 M iodozincmethylene reagent prepared as described in Example 1 and the resulting reaction mixture is allowed to stand in a nitrogen atmosphere for about 20 hours. At the end of that time 50 parts of saturated ammonium chloride is added and that mixture is stirred for about 30 minutes, then it is extracted with ether. The ether extract is washed successively with aqueous ammonium chloride, water and aqueous potassium bicarbonate, then dried over anhydrous sodium sulfate and sttripped of solvent by distillation in a nitrogen atmosphere. The solid crude product is purified by recrystallization from aqueous methanol to afford pure 3-methyleneandrost-4-ene-2α,17β-diol 17-acetate, melting at about 175–178°. An ultraviolet absorption maximum is observed at about 238 millimicrons with a molecular extinction coefficient of about 22,000. Infrared absorption peaks are displayed at about 2.84, 3.23, 5.80 and 6.08 microns.

EXAMPLE 11

To a solution of 19.2 parts of 3β-benzyloxy-5α-hydroxy-pregnane-6,20-dione 20-ethylene ketal in 67.5 parts of tetrahydrofuran is added 110 parts by volume of an approximately 0.8 M iodozincmethylene reagent prepared as described in Example 1 and the reaction mixture is stirred at room temperature for about 24 hours. 25% aqueous ammonium chloride in the amount of 100 parts by volume is then added cautiously and the resulting mixture is extracted with ether. Removal of the ether by distillation under reduced pressure affords an oily residue containing 3β-benzyloxy-5α-hydroxy-6-methylenepregnan- 20-one 20-ethylene ketal. That material is dissolved in 80 parts of acetone, then is added to a solution of 2 parts of concentrated hydrochloric acid in 20 parts of water. The resulting reaction mixture is stirred at room temperature for about 15 minutes, then is diluted with water. The precipitate thus formed is collected by filtration, dried and recrystallized from methylene chloride-methanol to afford 3β-benzyloxy-5α-hydroxy-6-methylene-pregnan-20-one, melting at about 180-183°. Infrared absorption maxima are observed at about 2.87, 3.24, 5.77 and 6.08 microns and nuclear magnetic resonance peaks at about 288 and 294 cycles per second.

EXAMPLE 12

To a solution of 10.1 parts of 3β,17β-diacetoxy-5α-hydroxyandrostan-6-one in 45 parts of tetrahydrofuran is added 70 parts by volume of approximately 0.8 M iodozincmethylene reagent prepared as described in Example 1 and the resulting reaction mixture is stirred at room temperature for about 3 hours. At that time 50 parts by volume of 25% aqueous ammonium chloride is added cautiously and the resulting mixture is extracted with ether. The ether layer is separated, washed successively with aqueous ammonium chloride and aqueous potassium bicarbonate, then dried over anhydrous sodium sulfate. Removal of the ether by distillation under nitrogen affords the crude product, which is purified by recrystallization from methylene chloride-methanol, thus affording pure 6-methyleneandrostane - 3β,5α - 17β - triol 3,17 - diacetate, melting at about 219-222°. Infrared absorption maxima are observed at about 2.90, 3.25, 5.78, 5.87 and 6.06 microns and nuclear magnetic resonance peaks are observed at about 280 and 288 cycles per second.

EXAMPLE 13

To a solution of 1 part of 6-methylenandrostane-3β,5α,17β-triol 3,17-diacetate in 24 parts of methanol is added 5 parts by volume of 45% aqueous potassium hydroxide and that mixture is allowed to stand in a nitrogen atmosphere at room temperature for about 16 hours. At the end of that time approximately 50 parts of water is added and the organic solvent is removed by distillation under reduced pressure. The solid which crystallizes from the mixture is collected by filtration, then purified by recrystallization from ethyl acetate-ether to yield 6-methylenandrostane-3β,5α,17β-triol melting at about 207-208°. Infrared absorption maxima are observed at about 2.95, 3.23 and 6.07 microns.

EXAMPLE 14

A mixture containing 5 parts of 6-methylenandrostane-3β,5α,17β-triol 3,17-diacetate, 5 parts of acetic anhydride, 5 parts of acetic acid, 0.15 part of p-toluenesulfonic acid and 10 parts of dioxane is stirred at room temperature for about 16 hours, then is partially concentrated under reduced pressure. Water is added to the residue and the semi-solid product formed is collected by filtration and purified by recrystallization from aqueous methanol to yield 6-methylenandrostane-3β,5α,17β-triol 3,5,17-triacetate, melting at about 116-118°. This compound exhibits infrared absorption maxima at about 5.78 and 6.08 microns.

EXAMPLE 15

The substitution of an equivalent quantity of 3β,17β-dipropionoxy-5α-hydroxyandrostan-6-one in the process of Example 12 results in 6-methylenandrostane-3β,5α,17β-triol 3,17-dipropionate.

When equivalent quantities of 6-methylenandrostane-3β,5α,17β-triol 3,17-dipropionate, propionic anhydride and propionic acid are substituted in the procedure of Example 14, there is produced 6-methylenandrostane-3β,5α,17β-triol 3,5,17-tripropionate.

EXAMPLE 16

By substituting an equivalent quantity of 17α-acetoxy-21-hydroxypregn-4-ene-3,11,20-trione and otherwise proceeding according to the process of Example 2, there is obtained 17α - acetoxy - 21 - hydroxy-20-methylenpregn-4-ene-3,11-dione.

EXAMPLE 17

The substitution of an equivalent quantity of ethylene glycol dimethyl ether for tetrahydrofuran in the procedure of Example 1 results in an approximately 1 M solution of the iodozincmethylene ethylene glycol dimethyl ether reagent.

EXAMPLE 18

To a suspension of 45 parts of the reagent described in Example 2 with 360 parts of tetrahydrofuran is added, at −15°, 22.5 parts of 3β,17α-diacetoxy-5α-hydroxypregnane-6,20-dione. Stirring at −15° is continued for about 15 minutes, at the end of which time the mixture is allowed to warm to room temperature. After the mixture has been stirred at room temperature for about 2 hours, a 1:1 mixture of acetic acid and water is added cautiously. The resulting solution is concentrated to approximately ¼ volume and about 300 parts of water is added. The resulting solid is collected by filtration, washed with water, then recrystallized from aqueous methanol to afford 3β,17α-diacetoxy - 5α - hydroxy-6-methylenepregnan-20-one, melting at about 190-195°. This compound exhibits nuclear magnetic resonance peaks at about 37, 52, 123, 128, 284 and 292 cycles per second.

What is claimed is:

1. The process which comprises contacting a reactive steroidal ketone with a methylenating reagent prepared by contacting activated zinc with a methylene halide selected from the group consisting of methylene bromide and methylene iodide in tetrahydrofuran or an alkylene glycol ether or a dialkoxyalkyl ether at elevated temperature to afford the corresponding methylene steroid.

2. The process of claim 1 wherein the methylenating agent is that prepared by contacting activated zinc with methylene bromide in tetrahydrofuran at elevated temperature.

3. The process of claim 1 wherein the keto group of the reactive steroidal ketone is activated by an adjacent hydroxy, acyloxy or oximino function.

4. The process of claim 1 wherein the keto group of the reactive steroidal ketone is activated by an adjacent hydroxy function.

5. The process of claim 1 wherein the reactive steroidal ketone is a steroidal ketol of the following partial structural formula

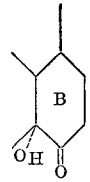

6. The process of claim 1 wherein the reactive steroidal ketone is a steroidal optionally acylated ketol of the following partial structural formula

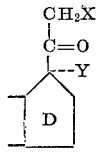

wherein X is a hydroxy or acetoxy group and Y is hydrogen or a hydroxy or acetoxy group.

7. A compound of the formula

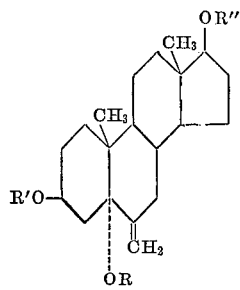

wherein R, R' and R" are selected from the group consisting of hydrogen and lower alkanoyl radicals.

8. As in claim 7, a compound of the formula

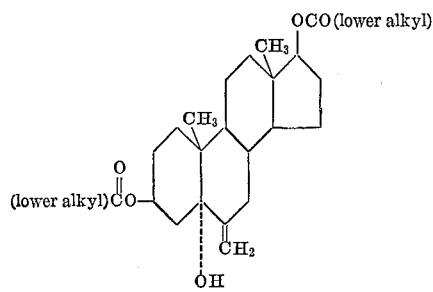

9. As in claim 7, a compound of the formula

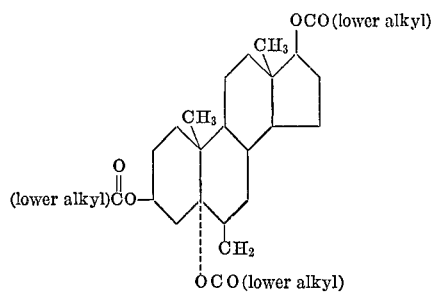

10. As in claim 7, the compound which is 6-methylene-androstane-3β,5α,17β-triol.

11. As in claim 7, the compound which is 6-methylene-androstane-3β,5α,17β-triol 3,17-diacetate.

12. As in claim 7, the compound which is 6-methylene-androstane-3β,5α,17β-triol 3,5,17-triacetate.

References Cited

UNITED STATES PATENTS 3,239,541   3/1966   Bowers et al. _____ 260—397.4
3,385,868   5/1968   Cross _____ 260—397.4

LEWIS GOTTS, Primary Examiner

E. G. LOVE, Assistant Examiner

U.S. Cl. X.R.

260—397.4, 397.45, 397.47, 346.1, 429.9

UNITED STATES PATENT OFFICE
CERTIFICATE OF CORRECTION

Patent No. 3,634,469  Dated January 11, 1972

Inventor(s) Leonard N. Nysted

It is certified that error appears in the above-identified patent and that said Letters Patent are hereby corrected as shown below:

Column 3, line 68, "tempreature" should be -- temperature --

Column 4, line 41, "iodozinicmethylene" should be -- iodozincmethylene --.

Column 5, line 46, "benzeneethyl" should be -- benzene-ethyl --.

Column 6, line 31, "satuarted" should be -- saturated --.

Column 6, line 54, "sttripped" should be -- stripped --.

Column 7, line 29, "methyleneandrostane" should be -- methylenandrostane --.

Column 10, formula

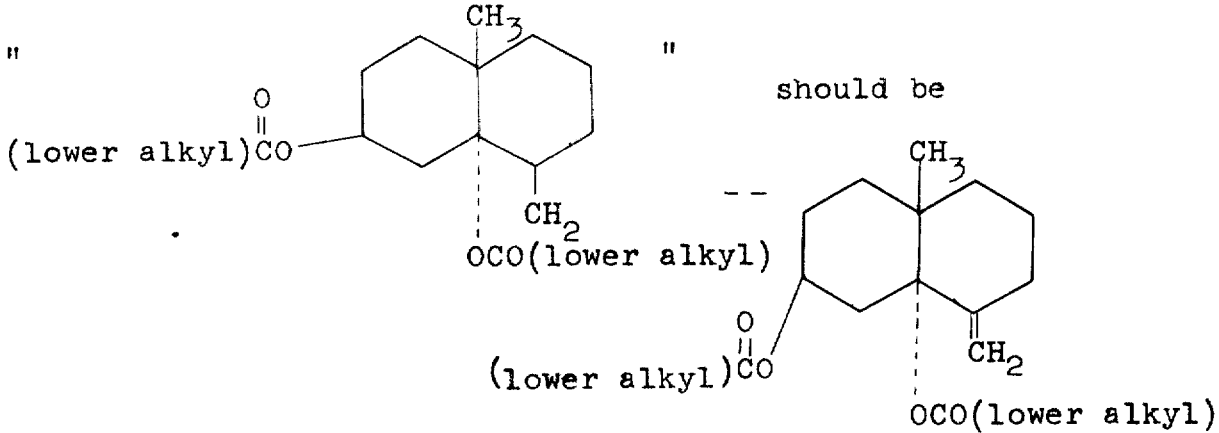

Signed and sealed this 18th day of July 1972.

(SEAL)
Attest:

EDWARD M. FLETCHER, JR.
Attesting Officer

ROBERT GOTTSCHALK
Commissioner of Patents